US010671876B1

(12) United States Patent
Smith et al.

(10) Patent No.: US 10,671,876 B1
(45) Date of Patent: Jun. 2, 2020

(54) VEHICLE BASED NOTIFICATION RECORD

(71) Applicant: VaaS, Inc., Fort Worth, TX (US)

(72) Inventors: Shawn B. Smith, Portola Valley, CA (US); Todd Hodnett, Fort Worth, TX (US)

(73) Assignee: VAAS INTERNATIONAL HOLDINGS, Chicago, IL (US)

( * ) Notice: Subject to any disclaimer, the term of this patent is extended or adjusted under 35 U.S.C. 154(b) by 0 days.

(21) Appl. No.: 15/719,380

(22) Filed: Sep. 28, 2017

Related U.S. Application Data

(60) Provisional application No. 62/400,632, filed on Sep. 28, 2016.

(51) Int. Cl.
G06K 9/00 (2006.01)
G06K 9/32 (2006.01)
G06K 9/62 (2006.01)
G06K 9/20 (2006.01)
G06K 9/78 (2006.01)
G01S 19/42 (2010.01)
H04L 29/08 (2006.01)

(52) U.S. Cl.
CPC .......... *G06K 9/3258* (2013.01); *G06K 9/209* (2013.01); *G06K 9/6202* (2013.01); *G06K 9/78* (2013.01); *G01S 19/42* (2013.01); *G06K 2209/15* (2013.01); *G06K 2209/27* (2013.01); *H04L 67/12* (2013.01)

(58) Field of Classification Search
CPC ........ G06K 9/3258; G06K 9/78; G06K 9/209; G06K 9/6202; G06K 2209/27; G06K 2209/15; G01S 19/42; H04L 67/12
See application file for complete search history.

(56) References Cited

U.S. PATENT DOCUMENTS 6,757,828 B1 * 6/2004 Jaffe .................. H04N 1/32128
380/200
9,477,978 B1 * 10/2016 Oakes, III ........... G06F 16/5846
2004/0151479 A1 * 8/2004 Ogikubo .............. G11B 27/032
386/217

(Continued)

FOREIGN PATENT DOCUMENTS

JP 05-250373 * 9/1993 ............. G07B 15/00

Primary Examiner — Amara Abdi

(57) ABSTRACT

Methods and systems for generating and storing a vehicle based notification record including evidentiary License Plate Recognition (LPR) information are presented herein. A vehicle based notification record includes evidentiary images generated by an LPR imaging system, a portable imaging system, or a combination thereof. The vehicle based notification record includes the collected evidentiary images in their native format including metadata. The collected images and metadata are preserved in their original format during communication, storage, and retrieval operations. In some embodiments, the geographic location of image capture is appended to the image metadata. In some embodiments, the images are digitally signed after capture and the digital signature is appended to the metadata of each respective image. In some embodiments, a clock of the LPR imaging system and a clock of the portable imaging system are synchronized with a network time server and time of image capture is appended to image metadata.

17 Claims, 5 Drawing Sheets

(56) References Cited

U.S. PATENT DOCUMENTS

| | | | |
|---|---|---|---|
| 2007/0192446 A1* | 8/2007 | Ivory | G11B 27/329 709/220 |
| 2012/0007983 A1* | 1/2012 | Welch | G07B 15/063 348/148 |
| 2014/0254879 A1* | 9/2014 | Smith | G06K 9/325 382/105 |
| 2014/0270384 A1* | 9/2014 | Nepomniachtchi | G06K 9/344 382/104 |
| 2017/0148102 A1* | 5/2017 | Franke | G06Q 10/20 |
| 2017/0372574 A1* | 12/2017 | Linsky | G08B 13/1966 |

* cited by examiner

| | MEMORY 145 | | | |
|---|---|---|---|---|
| PLATE # | LOCATION | TIME | IMAGES | |
| XYZ123 | 27.657912, -92.579146 | 03/12/2010, 23:14 | P11.EVD P12.EVD ⋮ P1J.EVD | ⎬ 161 |
| ABC125 ⋮ | 27.557257, -92.438514 ⋮ | 03/13/2010, 21:36 ⋮ | P21.EVD P22.EVD ⋮ P2J.EVD | ⎬ 162 |
| NIT489 ⋮ | 27.657911, -92.579145 ⋮ | 03/14/2010, 23:14 ⋮ | PN1.EVD PN2.EVD ⋮ PNJ.EVD ⋮ | ⎬ 163 |

VEHICLE BASED NOTIFICATION RECORD

CROSS REFERENCE TO RELATED APPLICATION

The present application for patent claims priority under 35 U.S.C. § 119 from U.S. provisional patent application Ser. No. 62/400,632, entitled "Vehicle Based Notification Record," filed Sep. 28, 2016, the subject matter of which is incorporated herein by reference.

TECHNICAL FIELD

The described embodiments relate to license plate recognition systems and tools.

BACKGROUND INFORMATION

License Plate Recognition (LPR) systems are typically employed to scan and log license plate information associated with vehicles in publically accessible areas. A typical LPR unit performs image analysis on captured images to identify the license plate number associated with each image. A typical LPR unit generates a record for each license plate number captured. The record may include any of an optical character recognition (OCR) interpretation of the captured license plate image (e.g., output in text string object format), images of the license plate number, a perspective image of the vehicle associated with the license plate number, the date and time of image capture, and the location of the LPR unit at the time of image capture. By continuing to operate each LPR unit for prolonged periods of time over a large area, the amount of aggregated license plate identification information grows. In addition, by combining the information generated by many LPR units, an LPR system may develop a large record of LPR information.

A large record of LPR information is useable for a variety of purposes. In one example, the location of a target vehicle may be identified based on a database of LPR information by searching the database for instances that match the license plate number of the target vehicle. Based on the time and location information that matches this license plate number, the target vehicle may be located without costly investigation. However, to validate that a vehicle has been located often requires specific notification procedures and proof that the required notification procedures have been faithfully executed. Existing LPR systems do not offer functionality to support proof of execution of required notification procedures.

Improvements to existing LPR systems are desired to facilitate recordation of LPR information and additional photographic information for evidentiary purposes.

SUMMARY

Methods and systems for generating and storing a vehicle based notification record including evidentiary License Plate Recognition (LPR) information are presented herein. The vehicle based notification record includes evidentiary images generated by an LPR imaging system, a portable imaging system, or a combination thereof. The vehicle based notification record includes the collected evidentiary images in their native format including metadata. The collected images and metadata are preserved in their original format during communication, storage, and retrieval operations.

In a further aspect, a user physically attaches a notification document to a vehicle when the estimated license plate number matches one of the target license plate numbers on a target vehicle list. In some examples, the notification document includes a weatherproof pouch containing a written notice. The pouch is removably attached to the vehicle using a temporary adhesive (e.g., glue, tape, etc.).

In another further aspect, an LPR system includes a portable imaging system that generates additional evidentiary information including one or more images of the vehicle. Images are collected by the portable imaging system and by the LPR imaging system during the same LPR visit. In addition, at least one of the images collected by the portable imaging system includes a view of the notification document attached to the vehicle.

In some embodiments, the indication of the geographic location of the LPR visit is appended to the metadata of the images of the vehicle collected by the LPR imaging system, the portable imaging system, or both.

In some embodiments, a clock of the LPR imaging system and a clock of the portable imaging system are synchronized with a network time server to ensure that documented time associated with each acquired image is correct.

In some embodiments, the images of the vehicle collected by the LPR imaging system, portable imaging system, or both, are digitally signed after capture and before communication to an LPR server and the digital signature is appended to the metadata of each respective image.

In some embodiments, the metadata of the images of the vehicle collected by the LPR imaging system, the portable imaging system, or both, include an indication of the image capture settings employed during image capture, an indication of time of image capture, and an identification number uniquely associated with the image capture device.

In another further aspect, the vehicle is temporarily removed from a target vehicle list after the notification document is attached to vehicle. If the vehicle owner complies with the notification within a predetermined period of time, the vehicle is permanently removed from target vehicle list. However, if the vehicle owner fails to comply with the notification within the predetermined period of time, the vehicle is reinstated onto the target vehicle list, and another notification is attached to the vehicle whenever the vehicle is subsequently identified by the LPR system.

The foregoing is a summary and thus contains, by necessity, simplifications, generalizations, and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

BRIEF DESCRIPTION OF THE DRAWINGS

FIG. 4 is a simplified diagram illustrative of a plurality of vehicle based notification records 164 stored in memory 145.

DETAILED DESCRIPTION

Reference will now be made in detail to background examples and some embodiments of the invention, examples of which are illustrated in the accompanying drawings.

Methods and systems for generating and storing a vehicle based notification record including evidentiary License Plate Recognition (LPR) information are presented herein. The vehicle based notification record includes evidentiary images generated by an LPR imaging system, a portable imaging system, or a combination thereof. The vehicle based notification record includes collected images in their native format including metadata. The collected images and metadata are preserved in their original format during communication, storage, and retrieval operations.

Figure 1:
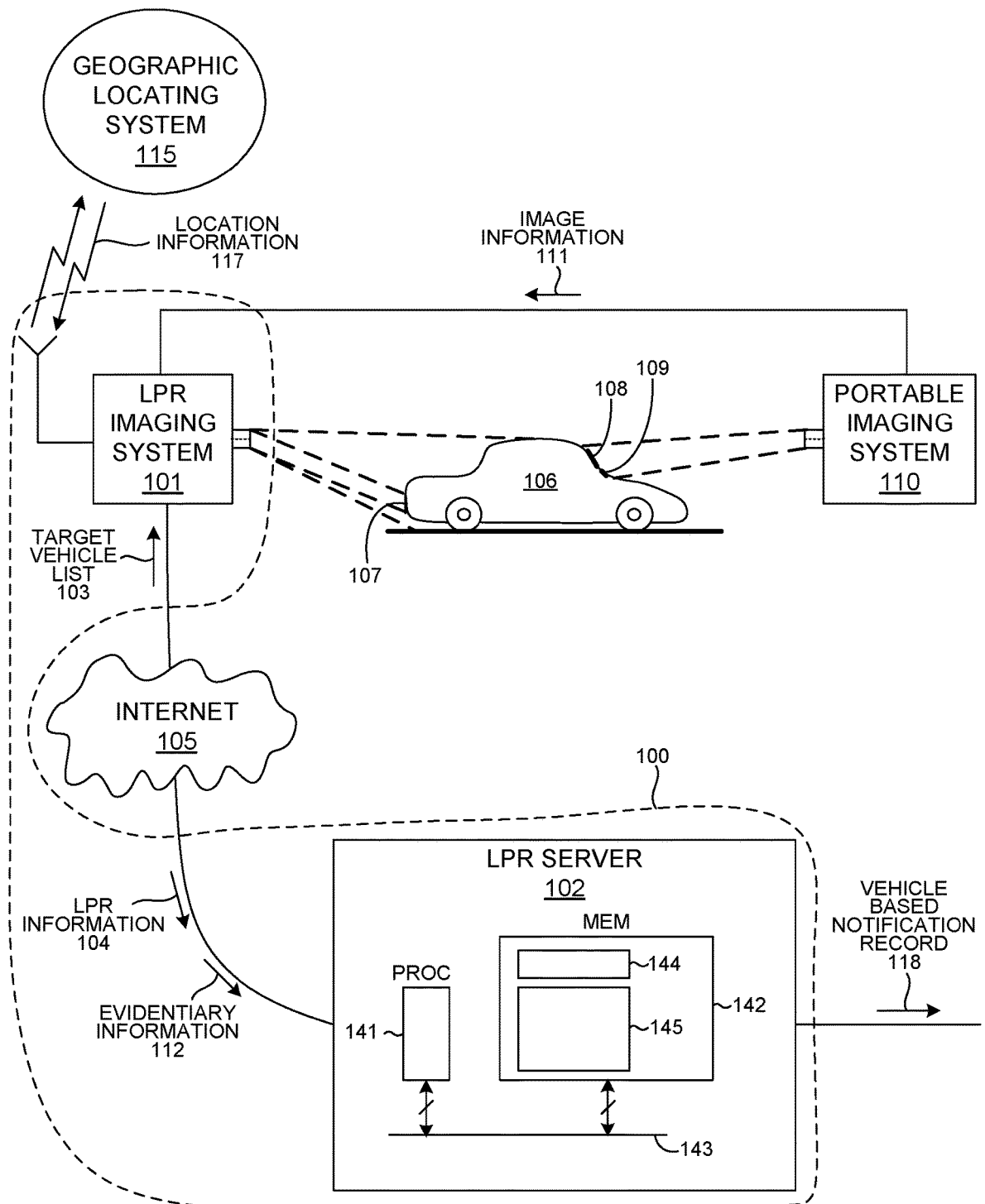
FIG. 1 is a simplified diagram illustrative of a License Plate Recognition (LPR) system 100 that includes an LPR imaging system 101 and an LPR server 102 that stores a database 145 of vehicle based notification records generated by one or more LPR imaging systems.

FIG. 1 is a diagram illustrative of a License Plate Recognition (LPR) system 100 that includes an LPR imaging system 101 and an LPR server 102 that stores a database 145 of vehicle based notification records generated by one or more LPR imaging systems. As depicted in FIG. 1, an image sensor of LPR imaging system 101 captures images of vehicles within the field of view during an LPR visit. In some embodiments, LPR imaging system 101 is attached to a moving vehicle that travels by parked vehicles, such as vehicle 106. As LPR imaging system 101 travels by vehicle 106, LPR imaging system 101 captures a sequence of images of the vehicle, including at least one image of license plate 107 attached to vehicle 106.

An LPR visit to a vehicle is a period of time during which a LPR imaging system approaches a vehicle, captures images of the vehicle, and ultimately moves away from the vehicle such that the vehicle is out of view of the LPR imaging system. Typically, an LPR visit lasts for several seconds to a few minutes. In some examples, an LPR visit may last several minutes, for example, if a user of the LPR imaging system stops near the vehicle to perform additional tasks, such as marking the vehicle, attaching a notification document to the vehicle, performing an investigation of the vehicle, etc.

The one or more LPR images of the vehicle captured by LPR imaging system 101 are analyzed. Based on the analysis of the captured images, LPR imaging system 101 estimates the license plate number associated with the license plate 107 attached to vehicle 106. The estimate of the license plate number is communicated from LPR imaging system 101 to LPR server 102 as part of LPR information 104.

In addition, LPR imaging system 101 compares the estimated license plate number with a plurality of target license plate numbers. If there is a match, the LPR images of the vehicle are communicated to LPR server 101 as part of evidentiary information 112.

In one aspect, the one or more LPR images communicated as part of evidentiary information 112 are maintained in their original native image format including all original metadata. In this manner, the one or more LPR images may be suitable for presentation into evidence in a legal proceeding.

In some embodiments, LPR imaging system 101 is in communication with a geographic location system 115. LPR imaging system 101 communicates a query to geographic locating system 115 requesting location information, time information, or both. In response, geographic location system 115 communicates location information 117 indicative of the physical location of each image capture, time of each image capture, or both. For example, the LPR imaging system 101 may determine the physical location and time of each image capture based on communication with a global positioning system (GPS) 115. In another example, the LPR imaging system 101 may determine the physical location and time of each image capture based on communication with a mobile phone service network 115. LPR imaging system 101 uploads the LPR images including the time and location of image capture to LPR imaging system 101 as part of the evidentiary information 112 that comprises the vehicle based notification record 118 associated with vehicle 106.

In the embodiment depicted in FIG. 1, LPR imaging system 101 is communicatively linked to LPR server 102 via the Internet 105. However, LPR imaging system 101 may be communicatively linked to LPR server 102 by any communication link known to those skilled in the art. For example, LPR imaging system 101 may be communicatively linked to LPR server 102 over a local area network (LAN), a wireless communications network, or any other suitable communications network.

Figure 2:
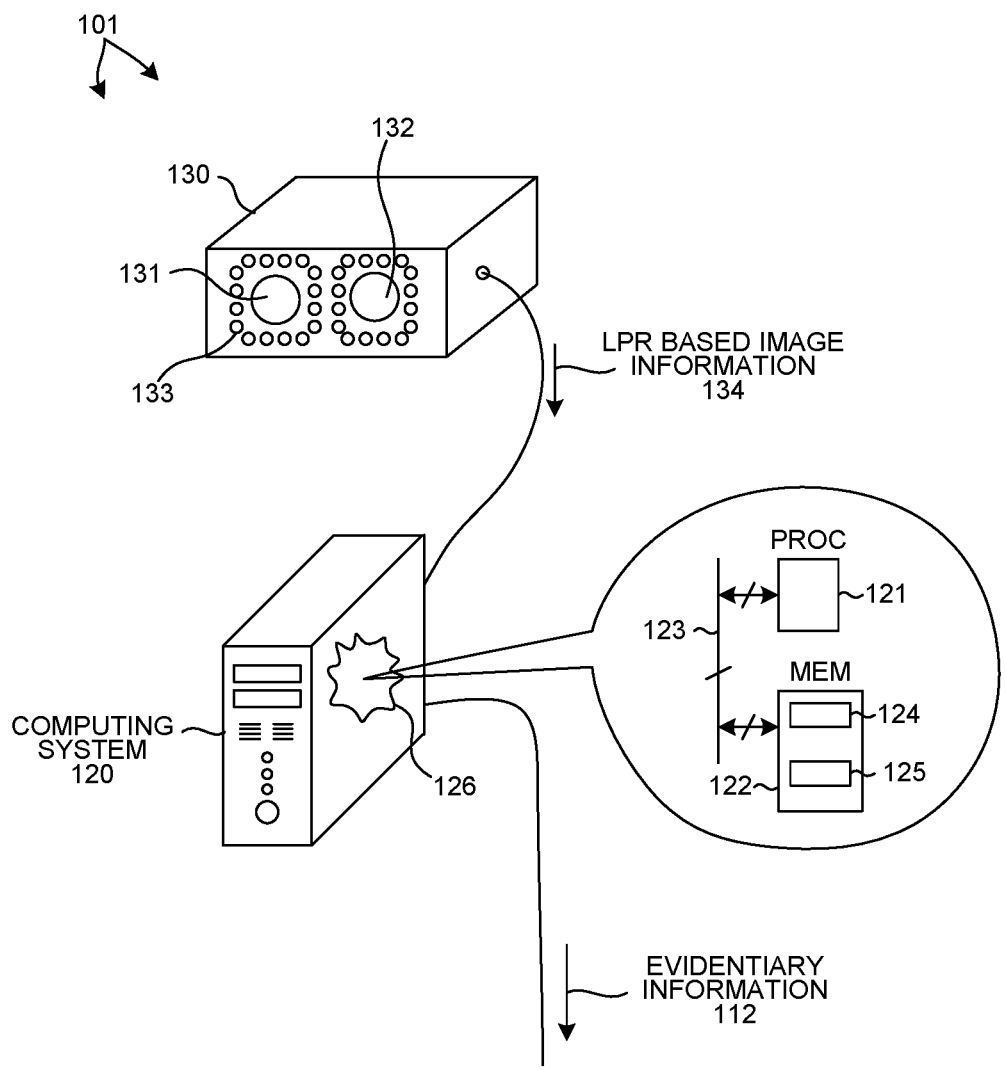
FIG. 2 depicts LPR imaging system 101 in one embodiment.

FIG. 2 depicts LPR imaging system 101 in one embodiment. As depicted in FIG. 2, LPR imaging system 101 includes a camera module 130 and a computing system 120 operable to implement tools useful to capture and communicate evidentiary information from LPR imaging system 101 to LPR server 102. In the embodiment depicted in FIG. 2, camera module 130 includes a charge coupled device (CCD) sensor 131 and associated optics and an infrared (IR) sensor 132 and associated optics. The CCD sensor 131 is configured to capture color images over a field of view that includes vehicle 106 depicted in FIG. 1. Similarly, the IR sensor 132 is configured to capture IR images over a field of view that also includes vehicle 106. In some embodiments, the fields of view of the IR sensor 132 and the CCD sensor 131 spatially overlap. Typically, the camera module 130 of an LPR imaging system 101 is configured with an IR sensor 132 and associated optics having a relatively narrow field of view to capture one or more images of the license plate of the vehicle with sufficient resolution to identify the license plate number. The CCD sensor 131 and associated optics are typically configured with a broader field of view to capture one or more images of a large portion, or the entirety, of the vehicle. However, in general, the image sensors may have the same or different fields of view. In the embodiment depicted in FIG. 2, the color and IR images are communicated to computing system 120 as LPR based image information 134.

As depicted in the embodiment of FIG. 2, camera module 130 also includes one or more illumination sources 133 configured to provide illumination of vehicles to improve the quality of captured images. In some examples, the one or more illumination sources 133 are configured to generate light in the infrared band, visible band, or both. In some embodiments, the one or more illumination sources are light emitting diodes. In general, any suitable illumination source may be contemplated.

Computing system 120 of LPR imaging system 101 includes a processor 121 and a memory 122. Processor 121 and memory 122 may communicate over bus 123. Memory 122 includes an amount of memory 124 that stores LPR information 104, and the one or more LPR images included as part of evidentiary information 112. Memory 122 also includes an amount of memory 125 that stores program code that, when executed by processor 121, causes processor 121 to implement evidentiary information collection (EIC) functionality by operation of EIC tool 126.

For illustration purposes, camera module 130 and computing system 120 are depicted as separate mechanical units. However, in some embodiments, camera module 130 and computing system 120 are mechanically integrated into a single enclosure, or housing, to provide a more compact and lower cost package. It is understood that many other system and mechanical architectures may be contemplated within the scope of this patent document.

In a further aspect, a user of LPR system 100 physically attaches a notification document 108 to vehicle 106 when the estimated license plate number matches one of the target license plate numbers on target vehicle list 103. In one example, the target vehicle list 103 includes vehicles that are subject to a manufacturer recall. In some examples, notification document 108 includes a weatherproof pouch containing a written notice. The pouch is removably attached to vehicle 106 using a temporary adhesive (e.g., glue, tape, etc.). In one example, the written notice describes the manufacturer recall and notifies the owner of the vehicle that compliance with the recall effort is required.

In another further aspect, the vehicle 106 is temporarily removed from target vehicle list 103 after the notification document 108 is attached to vehicle 106 by a user of LPR system 100. If the vehicle owner complies with the notification within a predetermined period of time (e.g., 30 days), vehicle 106 is permanently removed from target vehicle list 103. However, if the vehicle owner fails to comply with the notification within the predetermined period of time, vehicle 106 is reinstated onto target vehicle list 103, and another notification is attached to vehicle 106 whenever the vehicle is subsequently identified by LPR system 100.

In another further aspect, LPR system 100 includes a portable imaging system 110 that generates additional evidentiary information including one or more images of the vehicle. The images are collected by the portable imaging system 110 during the same LPR visit when the LPR imaging system 101 captures the LPR images described hereinbefore. In addition, at least one of the images collected by the portable imaging system 110 includes a view of the notification document attached to the vehicle.

As depicted in FIG. 1, portable imaging system 110 is communicatively linked to LPR imaging system 101. LPR imaging system 101 may be communicatively linked to portable imaging system 110 by any suitable communication link known to those skilled in the art. For example, LPR imaging system 101 may be communicatively linked to portable imaging system 110 over a wired communications link, a wireless communications link, or any other suitable communications network.

The one or more images of the vehicle captured by portable imaging system 110 are communicated to LPR imaging system 101 as image information 111. The images of the vehicle are further communicated to LPR server 101 as part of evidentiary information 112. The one or more images collected by the portable imaging system 110 and communicated as part of evidentiary information 112 are maintained in their original native image format including all original metadata. In this manner, the one or more images may be suitable for presentation into evidence in a legal proceeding. As depicted in FIG. 1, vehicle based notification record 118 includes evidentiary information associated with vehicle 106, including images collected by portable imaging system 110 and LPR images collected by LPR imaging system 101.

Figure 3:
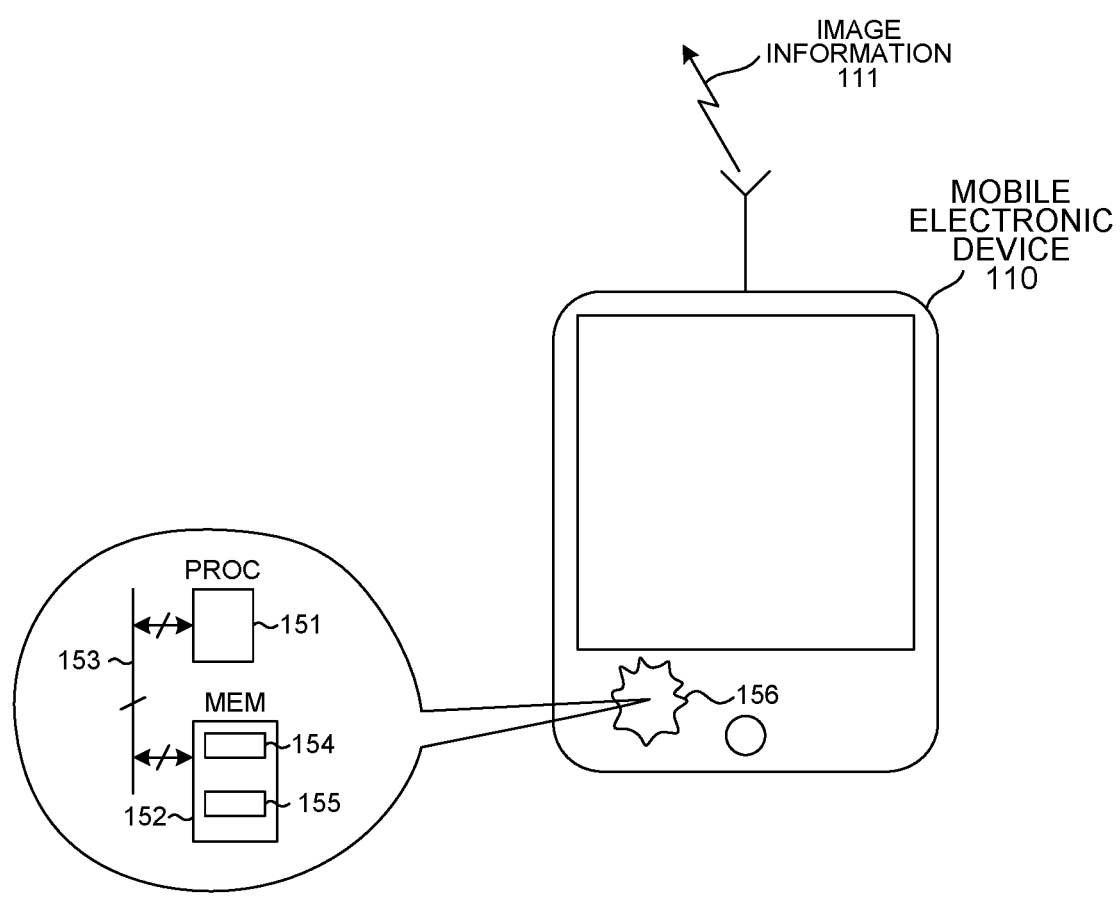
FIG. 3 is a simplified diagram depicting a portable imaging system 110 operable to collect one or more images of the vehicle 106 and communicate the collected images to LPR imaging system 101 in their original native image format including all original metadata.

FIG. 3 depicts a portable imaging system 110 implemented as a mobile electronic device 110 operable to collect one or more images of the vehicle 106 and communicate the collected images to LPR imaging system 101 in their original native image format including all original metadata. Mobile electronic device 110 includes a processor 151 and a memory 152. Processor 151 and memory 152 may communicate over bus 153. Memory 152 includes an amount of memory 154 that stores a number of images of vehicle 106. Memory 152 also includes an amount of memory 155 that stores program code that, when executed by processor 151, causes mobile electronic device 110 to implement evidentiary information collection (EIC) functionality by operation of EIC tool 156. By way of non-limiting example, mobile electronic device may be a laptop computer, a smartphone, or a tablet computer operable to communicate with LPR imaging system 101 over a wireless network.

Mobile electronic device 110 includes a camera module (not shown) that captures one or more images of vehicle 106, including at least one image that includes a view of notification document 108. In some examples, the captured images include a view of a vehicle identification number (VIN) 109 fixedly attached to vehicle 106. In some examples, a collected image includes a view of both the VIN 109 and the notification document 108. Typically, a user operating the mobile electronic device 110 moves around vehicle 106 and captures images sufficient to document that a notification document 108 was attached to vehicle 106.

In some embodiments, mobile electronic device 110 is in communication with a geographic location system 115 to determine the physical location and time of each image capture. For example, the mobile electronic device 110 may determine the physical location and time of each image capture based on communication with a global positioning system (GPS) 115. In another example, the mobile electronic device 110 may determine the physical location and time of each image capture based on communication with a mobile phone service network 115.

In some embodiments, mobile electronic device 110 uploads the image information 111 including the time and location of image capture to LPR imaging system 101. In turn, LPR imaging system 101 uploads the image information 111 to LPR server 102 as part of evidentiary information 112. In some other embodiments, mobile electronic device 110 uploads the image information 111 including the time and location of image capture to LPR server 102 directly. In these embodiments, the time and location of image capture is communicated to LPR server 102 as part of the evidentiary information from portable imaging system 110 that comprises the vehicle based notification record 118 associated with vehicle 106.

In some embodiments, the indication of the geographic location of the LPR visit is appended to the metadata of the images of vehicle 106 collected by LPR imaging system 101, portable imaging system 110, or both.

In some embodiments, a clock of the LPR imaging system 101 and a clock of the portable imaging system 110 are synchronized with a network time server to ensure that documented time associated with each acquired image is correct.

In some embodiments, the images of vehicle 106 collected by LPR imaging system 101, portable imaging system 110, or both, are digitally signed after capture and before communication to the LPR server 102 and the digital signature is appended to the metadata of each respective image.

In some embodiments, the metadata of the images of vehicle 106 collected by LPR imaging system 101, portable imaging system 110, or both, include an indication of the image capture settings employed during image capture, an indication of time of image capture, and an identification number uniquely associated with the image capture device.

LPR server 102 includes a processor 141 and an amount of memory 142. Processor 141 and memory 142 may communicate over bus 143. Memory 143 includes an amount of memory 144 that stores a database program executable by processor 141. Exemplary, commercially available database programs include Oracle®, Microsoft SQL Server®, IBM DB2®, etc. Memory 142 also includes an amount of memory that stores an LPR database 145 of vehicle based notification records searchable by the database program executed by processor 141.

By way of non-limiting example, LPR server 102 is operable to communicate with an external computing system (not shown) over a communications link.

In one example, LPR server 102 is operable to periodically communicate the target vehicle list 103 to LPR imaging system 101 to maintain an updated list of target vehicles available on LPR imaging system 101. In addition, LPR server 102 is operable to receive an updated target vehicle list 103 from an external computing system.

In another example, an external computing system requests a vehicle based notification record associated with a particular license plate number, and in response, LPR server 102 communicates the vehicle based notification record 118 associated with the particular license plate number to the external computing system.

By way of non-limiting example, FIG. 4 is illustrative of a plurality of vehicle based notification records 164 stored in memory 145. A vehicle based notification record includes an indication of the particular vehicle license plate number recognized by an LPR imaging system 101 at a particular location and time, and the evidentiary information 112 associated with the LPR visit to that particular vehicle. In the example illustrated in FIG. 4, vehicle based notification records 161-163 each record an indication of the recognized vehicle license plate number, an indication of the location where the plate was recognized, an indication of the time that the plate was recognized, and the evidentiary information associated with the LPR visit. In other examples, additional information may be stored with any vehicle based notification record. For example, an index identifier may be associated with each vehicle based notification record. The index identifier may be useful to facilitate sorting and organizing the plurality of vehicle based notification records.

Figure 5:
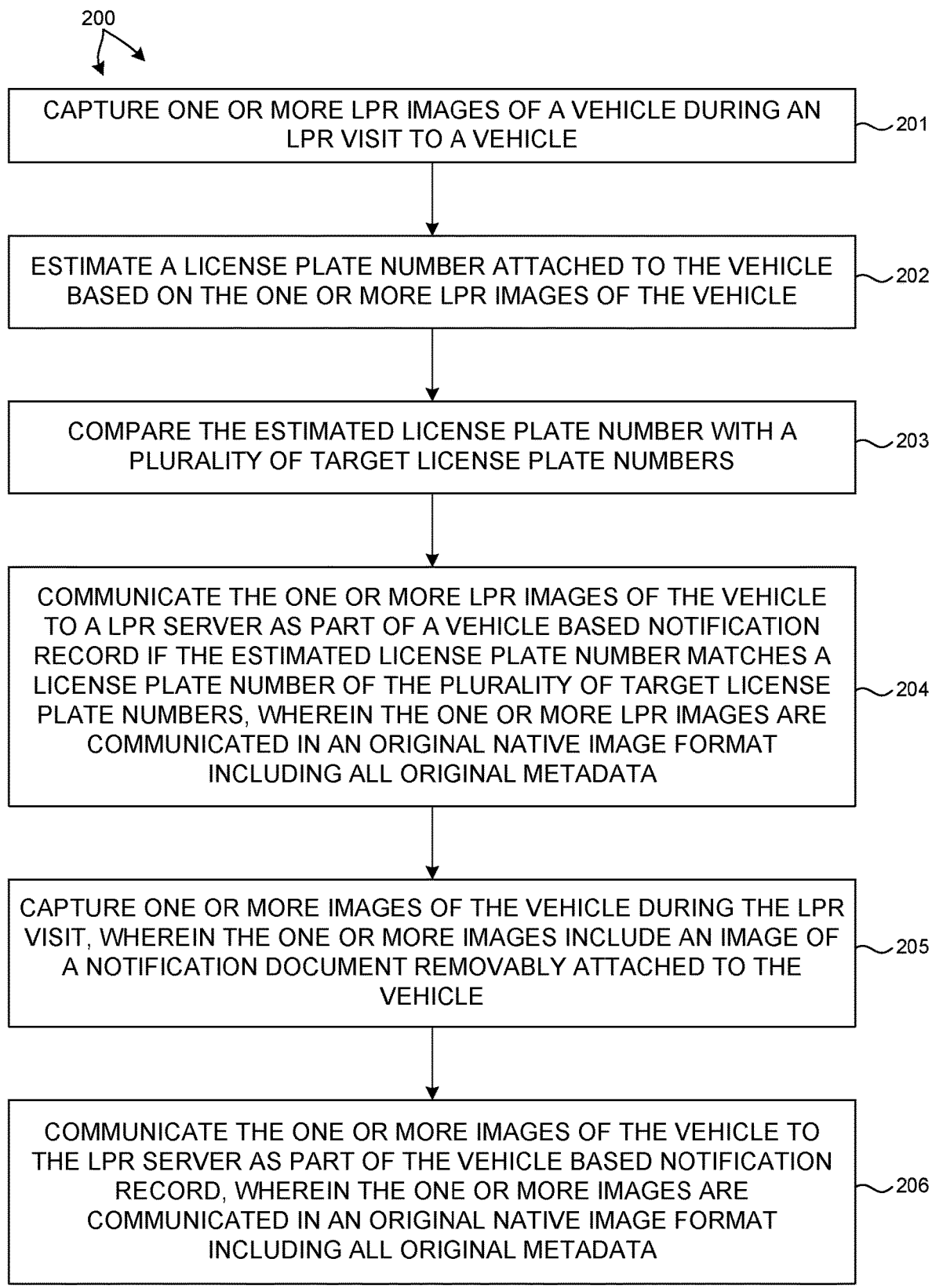
FIG. 5 is a flowchart illustrative of a method 200 for generating a vehicle based notification record associated with a target vehicle.

FIG. 5 illustrates a method 200 for generating a vehicle based notification record associated with a target vehicle. Method 200 is suitable for implementation by a LPR system such as LPR system 100 illustrated in FIG. 1 of the present invention. In one aspect, it is recognized that data processing blocks of method 200 may be carried out via a pre-programmed algorithm executed by one or more processors of LPR system 100, or any other general purpose computing system. It is recognized herein that the particular structural aspects of LPR system 100 do not represent limitations and should be interpreted as illustrative only.

In block 201, one or more LPR images of a vehicle are captured during an LPR visit to a vehicle.

In block 202, a license plate number attached to the vehicle is estimated based on the one or more LPR images of the vehicle.

In block 203, the estimated license plate number is compared with a plurality of target license plate numbers.

In block 204, the one or more LPR images of the vehicle are communicated to a LPR server as part of a vehicle based notification record if the estimated license plate number matches a license plate number of the plurality of target license plate numbers. The one or more LPR images are communicated in an original native image format including all original metadata.

In block 205, one or more images of the vehicle are captured during the LPR visit. The one or more images include an image of a notification document removably attached to the vehicle.

In block 206, the one or more images of the vehicle are communicated to the LPR server as part of the vehicle based notification record. The one or more images are communicated in an original native image format including all original metadata.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A License Plate Recognition (LPR) system comprising:
   a LPR imaging system comprising:
      an image sensor configured to capture one or more LPR images of a vehicle during an LPR visit to the vehicle; and
      a computing system configured to:
         estimate a license plate number attached to the vehicle based on the one or more LPR images of the vehicle;

compare the estimated license plate number with a plurality of target license plate numbers; and
communicate the one or more LPR images of the vehicle to a LPR server as part of a vehicle based notification record if the estimated license plate number matches a license plate number of the plurality of target license plate numbers, wherein the one or more LPR images are communicated in an original native image format including all original metadata;

a portable imaging system comprising:
  an image sensor configured to capture one or more images of the vehicle during the LPR visit, wherein the one or more images include an image of a notification document removably attached to the vehicle, wherein the one or more images include an image of a vehicle identification number fixedly attached to the vehicle, wherein the image of the vehicle identification number fixedly attached to the vehicle also includes an image of the notification document; and
  a computing system configured to communicate the one or more images of the vehicle to the LPR imaging system, wherein the vehicle based notification record includes the one or more images, and wherein the one or more images are communicated in an original native image format including all original metadata.

2. The LPR system of claim 1, wherein the computing system of the LPR imaging system is further configured to:
  receive an indication of a geographic location of the LPR visit from a geographic locating system; and
  communicate the indication of the geographic location to the LPR server as part of the vehicle based notification record.

3. The LPR system of claim 1, wherein a clock of the LPR imaging system and a clock of the portable imaging system are synchronized with a network time server.

4. The LPR system of claim 1, wherein the one or more images of the vehicle are digitally signed after capture and before communication to the LPR server, wherein the digital signature is appended to the metadata of the one or more images of the vehicle, and wherein the one or more LPR images of the vehicle are digitally signed after capture and before communication to the LPR server, wherein the digital signature is appended to the metadata of the one or more LPR images of the vehicle.

5. The LPR system of claim 1, wherein the metadata of the one or more images and the metadata of the one or more LPR images include an indication of a plurality of image capture settings, an indication of time of image capture, and an identification number uniquely associated with the image capture device.

6. The LPR system of claim 2, wherein the indication of the geographic location of the LPR visit is appended to the metadata of the one or more images of the vehicle, the one or more LPR images, or both.

7. The LPR system of claim 2, wherein the computing system of the LPR imaging system is further configured to:
  receive an indication of the plurality of target license plate numbers from the LPR server.

8. A method comprising:
  capturing one or more LPR images of a vehicle during an LPR visit to a vehicle;
  estimating a license plate number attached to the vehicle based on the one or more LPR images of the vehicle;
  comparing the estimated license plate number with a plurality of target license plate numbers;
  communicating the one or more LPR images of the vehicle to a LPR server as part of a vehicle based notification record if the estimated license plate number matches a license plate number of the plurality of target license plate numbers, wherein the one or more LPR images are communicated in an original native image format including all original metadata;
  capturing one or more images of the vehicle during the LPR visit, wherein the one or more images include an image of a notification document removably attached to the vehicle, wherein the one or more images include an image of a vehicle identification number fixedly attached to the vehicle, wherein the image of the vehicle identification number fixedly attached to the vehicle also includes an image of the notification document; and
  communicating the one or more images of the vehicle to the LPR server as part of the vehicle based notification record, wherein the one or more images are communicated in an original native image format including all original metadata.

9. The method of claim 8, further comprising:
  receiving an indication of a geographic location of the LPR visit from a geographic locating system; and
  communicating the indication of the geographic location to the LPR server as part of the vehicle based notification record.

10. The method of claim 8, further comprising:
  digitally signing any of the one or more images of the vehicle after capture and before communication to the LPR server.

11. The method of claim 10, further comprising:
  appending the digital signature to the metadata of the one or more images of the vehicle.

12. The method of claim 8, wherein the metadata of the one or more images and the metadata of the one or more LPR images include an indication of a plurality of image capture settings, an indication of time of image capture, and an identification number uniquely associated with the image capture device.

13. A License Plate Recognition (LPR) system comprising:
  a first image sensor configured to capture one or more LPR images of a vehicle during an LPR visit to a vehicle;
  a second image sensor configured to capture one or more images of the vehicle during the LPR visit to the vehicle, wherein the one or more images include an image of a notification document removably attached to the vehicle, wherein the one or more images include an image of a vehicle identification number fixedly attached to the vehicle, wherein the image of the vehicle identification number fixedly attached to the vehicle also includes an image of the notification document;
  one or more processors; and
  an amount of memory storing an amount of program code that when executed by the one or more processors causes the one or more processors to:
    estimate a license plate number attached to the vehicle based on the one or more LPR images of the vehicle;
    compare the estimated license plate number with a plurality of target license plate numbers;
    communicate the one or more LPR images of the vehicle to a LPR server as part of a vehicle based notification record if the estimated license plate number matches a license plate number of the plurality of target license plate numbers, wherein the one or more LPR images are communicated in an original native image format including all original metadata; and communicate the one or more images of the vehicle to the LPR server as part of the vehicle based notification record, wherein the one or more images are communicated in an original native image format including all original metadata.

14. The LPR system of claim 13, the amount of memory further storing an amount of program code that when executed by the one or more processors causes the one or more processors to:

receive an indication of a geographic location of the LPR visit from a geographic locating system; and communicate the indication of the geographic location to the LPR server as part of the vehicle based notification record.

15. The LPR system of claim 14, wherein the indication of the geographic location of the LPR visit is appended to the metadata of the one or more images of the vehicle, the one or more LPR images, or both.

16. The LPR system of claim 14, wherein the one or more images of the vehicle are digitally signed after capture and before communication to the LPR server, wherein the digital signature is appended to the metadata of the one or more images of the vehicle, and wherein the one or more LPR images of the vehicle are digitally signed after capture and before communication to the LPR server, wherein the digital signature is appended to the metadata of the one or more LPR images of the vehicle.

17. The LPR system of claim 14, wherein the metadata of the one or more images and the metadata of the one or more LPR images include an indication of a plurality of image capture settings, an indication of time of image capture, and an identification number uniquely associated with the image capture device.

* * * * *